Aug. 8, 1961   D. MANNHEIMER   2,995,739
RADIO NAVIGATION STATION KEEPING SYSTEM
Filed July 11, 1956   3 Sheets-Sheet 1

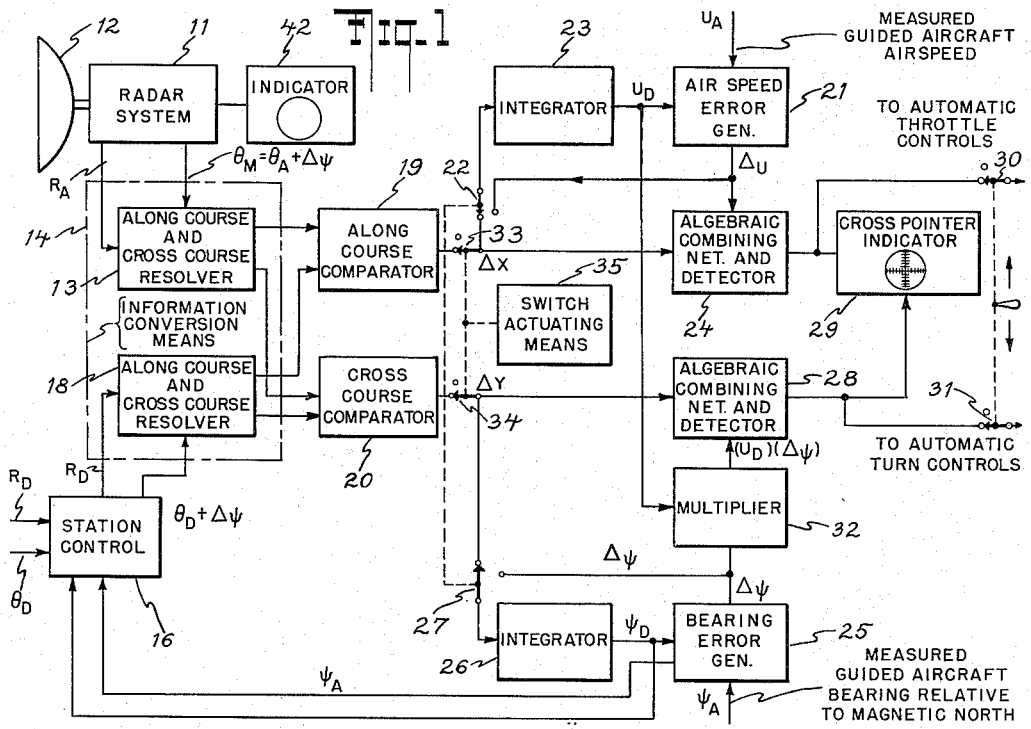

Fig. 1

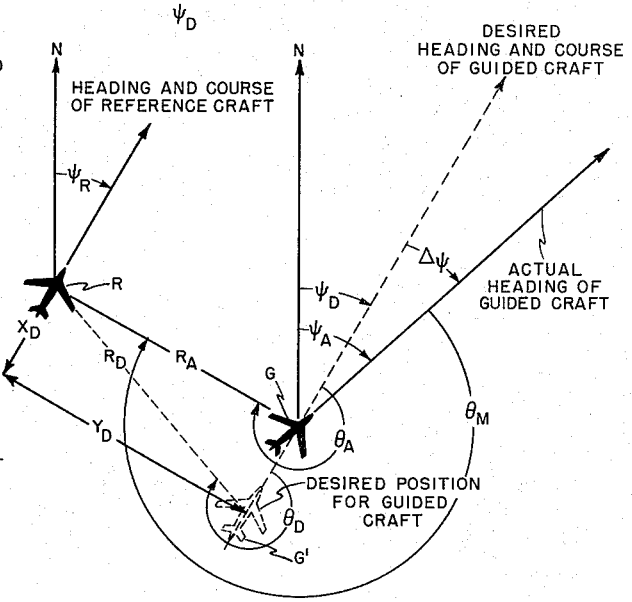

Fig. 2

$\theta_D$ = BEARING ANGLE BETWEEN DESIRED HEADING OF GUIDED CRAFT AND LINE JOINING DESIRED POSITION OF GUIDED CRAFT TO POSITION OF REF. CRAFT $\theta_A$ = BEARING ANGLE BETWEEN ACTUAL AVERAGE HEADING OF GUIDED CRAFT AND LINE JOINING ACTUAL POSITION OF GUIDED CRAFT TO POSITION OF REF. CRAFT $\psi_R$ = ANGLE BETWEEN MAGNETIC NORTH AND HEADING OF REF. CRAFT $\psi_D$ = ANGLE BETWEEN MAGNETIC NORTH AND DESIRED HEADING OF REF. CRAFT $\psi_A$ = ANGLE BETWEEN MAGNETIC NORTH AND ACTUAL HEADING OF GUIDED CRAFT $\Delta\psi = \psi_D - \psi_A$ = HEADING ERROR OF GUIDED CRAFT $\theta_M$ = ANGLE BETWEEN ACTUAL HEADING OF GUIDED CRAFT AND LINE JOINING ACTUAL POSITION OF GUIDED CRAFT TO POSITION OF REF. CRAFT

INVENTOR
DAVID MANNHEIMER
BY
ATTORNEY

United States Patent Office 2,995,739
Patented Aug. 8, 1961

2,995,739
RADIO NAVIGATION STATION KEEPING SYSTEM
David Mannheimer, West Hempstead, N.Y., assignor to Sperry Rand Corporation, a corporation of Delaware
Filed July 11, 1956, Ser. No. 597,300
12 Claims. (Cl. 343—7)

The present invention relates to a radio navigation station keeping system.

It is an object of the present invention to provide a range-azimuthal station keeping system for enabling one moving craft to be maintained during a formation mode of operation at an accurate predetermined position relative to another moving craft in the absence of visual contact therebetween.

It is another object to provide a system as aforedescribed which procedures an indication of along-course and cross-course deviations of a guided craft from a predetermined position relative to a reference craft.

It is a further object to provide a system as aforedescribed which can be automatically operated for guiding a craft near a predetermined station relative to a reference craft to such a station with a minimum of overshoot.

It is yet another object to provide a system as aforedescribed which will perform stably despite momentary interruption of positional measurements due to breaking of radio contact either unknowingly or due to deliberate cessation of radio transmission for security purposes.

It is a further object to provide a system as aforedescribed in which attitude changes of the guided aircraft will not disturb positional measurements or indications.

The foregoing and other objects and advantages of the present invention, which will become more apparent upon reading the detailed description thereof, are attained by a system for use aboard a craft to be guided which receives information related to a "set-in" precision desired range and bearing and radar system information concerning actual range and bearing between a reference and a guided craft. The foregoing information is resolved into actual and desired along-course and cross-course signals, and then supplied to comparator means for determining the difference between the actual and desired along-course and cross-course signals. When the craft to be guided is not, or does not remain, at its proper station relative to the reference craft, positional error signals from the comparator means are supplied to longitudinal and lateral craft control channels for conversion into information for use in enabling the guided craft to be brought into and/or remain at its desired station. The aforementioned craft control channels include means for mixing the positional error signals with rate signals proportional to speed difference and heading difference times air speed of the guided craft from a desired speed and heading to acquire or maintain a proper station for the guided craft, therefore providing a stable control situation.

Referring to the drawings,

FIG. 1 is a functional block diagram for following the flow of information in the station keeping system of the present invention;

FIG. 2 is a diagram for illustrating some of the bearing and range relationships involved in the station keeping problem; and, FIGS. 3a and 3b comprise a schematic diagram of the complete station keeping system of the present invention.

Figure 3A:
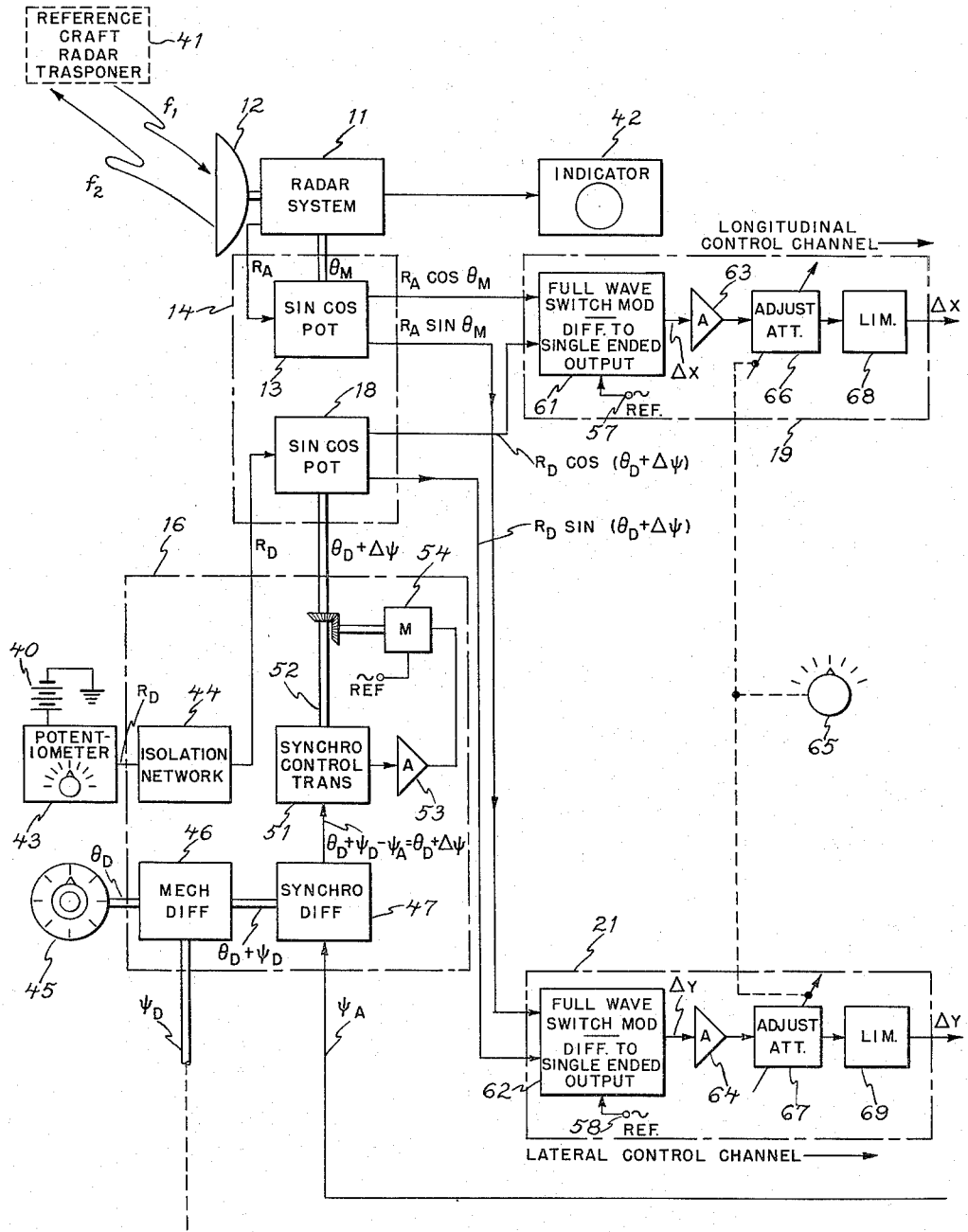

In FIG. 2, the letters R and G represent a reference and a guided aircraft, respectively, flying at the same height in the same plane above ground. The problem to be solved by the station keeping system of the present invention is to maintain a predetermined along-course distance relationship $X_D$ and a predetermined cross-course distance relationship $Y_D$ between the two aircraft during a formation mode of flying, the dotted configuration G' representing the aircraft G when at a proper position or station relative to the reference aircraft R. The aircraft G indicated by the solid configuration thereof in FIG. 2 has a proper cross-course distance relationship $Y_D$, but an erroneous along-course relationship from a desired along-course distance $X_D$ and an erroneous heading caused by a temporary yaw from an average heading of the guided craft. The average heading of the aircraft G in the example of FIG. 2 is along a course parallel with that of the reference craft, for example. Various bearing angles and other information necessary for understanding the details of operation of the station keeping system are indicated and defined in FIG. 2.

Referring to FIG. 1 in conjunction with FIG. 2, the numeral 11 represents a radar system adapted to be carried aboard the aircraft G to be guided, having an antenna 12 for directing radio energy towards and receiving radio energy from the reference aircraft R. The radar system 11 is adapted to provide slant range information $R_A$ and bearing angle information $\theta_M$ between the two aircraft. The bearing angle information $\theta_M$ comprises the angle measured from the longitudinal axis of the aircraft G to a line connecting the aircrafts R and G as indicated in FIG. 2. An along-course and cross-course resolver 13 of information conversion means 14 receives the aforementioned range $R_A$ and bearing information $\theta_M$ and converts it into along-course and cross-course information related to actual coordinate positions of the guided craft G relative to the reference craft R.

Precision desired range information $R_D$ and desired bearing angle information $\theta_D$ is "set-in" to a station control 16 aboard the craft to be guided. This information should have suitable values so that it is resolvable into the desired along-course and cross-course coordinate components $X_D$ and $X_D$, respectively, the proper values of such components being predetermined before flight of the aircraft. The information $R_D$ appears at one of the outputs of the station control 16 and a modified version of $\theta_D$ compensated for attitude changes of the guided aircraft appears at the other output thereof.

The station control 16 also receives $\psi_A$ information concerning the measured instantaneous heading of the guided aircraft relative to magnetic north as shown in FIG. 2. Desired bearing information $\psi_D$ related to a desired heading of the reference aircraft relative to magnetic north during a formation mode of operation is also supplied to the station control 16, the station control combining the aforementioned bearing information to provide a bearing signal output proportional to $\theta_D + \psi_D - \psi_A = \theta_D + \Delta\psi$. The term $\Delta\psi$ represents an angle between the actual instantaneous heading of the guided craft and a desired heading therefor, $\Delta\psi$ occurring with random changes in aircraft attitude such as might be caused by sudden changes in wind, for example. The term $\Delta\psi$ has a (minus) sign when the actual heading of the guided craft is to the right of its desired heading, and a (plus) sign when the actual heading of the guided craft is to the left of its desired heading. The angles $\theta_M$, $\theta_D$, $\psi_A$ and $\psi_D$ are preferably measured in the same direction so that no confusion in their signs will occur.

The information represented by the aforementioned term $\Delta\psi$ is algebraically combined with $\theta_D$ information supplied to station control 16 to compensate for the fact that the bearing angle information at the output of the radar system 11 is actually $\theta_M = \theta_A + \Delta\psi$, where $\theta_A$ is an angle measured in the same direction as $\theta_M$ from a line along the average heading of the guide craft to a line connecting the reference and guided crafts as shown in FIG.

2. Thus, the bearing information outputs from the radar system 11 and station control 16 during a formation mode of flying will differ only by amounts proportional to the difference in the angles $\theta_A$ and $\theta_D$ regardless of any temporary yaw of the guided aircraft from an average heading. If the guided aircraft is located at its proper station, the bearing angle outputs from the radar system 11 and station control 16 remain equal until $\theta_A$ actually differs from $\theta_D$.

The foregoing compensation of $\theta_D$ is important so that positional measurements of the guided aircraft are not affected by yaw attitude changes thereof and allows the overall frequency response of the station control system to be low and noise free following relatively slow positional rates rather than the relative high directional rates. Aircraft roll and pitch in a flat formation, for small angles, have little effect on measurement of $R_A$ and $\theta_M$ provided the radiation pattern of antenna 12 is broad in a vertical plane such as would be employed in a track-while-scan radar system employing a search antenna with directional stabilization of the data concerning the reference aircraft. If a tracking radar system is employed with the antenna 12 always pointing in the direction of the reference aircraft, suitable means should be provided therewith for stabilization of the antenna for pitch and roll of the guided aircraft. The radar system 11 and antenna 12 might comprise either type system although a track-while-scan system would be preferable in a tight formation since a view of objects other than the reference aircraft in the vicinity of the guided craft would be provided by a track-while-scan system.

An along-course and cross-course resolver 18 of the information conversion means is coupled to the range signal $R_D$ and the bearing signal $\theta_D + \Delta \psi$ outputs of the station control 16. Resolver 18 is adapted to produce an along-course signal and a cross-course signal related to a desired position for the guided craft G relative to the reference craft R.

The along-course information from the resolvers 13 and 18 is supplied to an along-course comparator 19 where it is changed into an along-course error signal $\Delta X$ proportional to the difference between a desired along-course relationship $X_D$ and the actual relationship $X_A$ of the guided relative to the reference craft. The cross-course information from resolvers 13 and 18 is supplied to the cross-course comparator 20 where it is changed into a cross-course error signal $\Delta Y$ proportional to the difference between a desired cross-course relationship $Y_D$ and an actual cross-course relationship $Y_A$ of the guided relative to the reference craft. This difference or "zero reading" technique is used to reduce the dynamic range of computation. The $\Delta X$ and $\Delta Y$ signals can be of relatively low accuracy as long as their zero values are correct, without undesirably affecting performance of the system.

Measured air speed information $U_A$ of the guided aircraft G is supplied to an air speed error generator 21 for comparison with desired air speed information $U_D$ from an integrator 23. The information $U_D$ is adapted to correspond to the measured air speed $U_A$ of the guided craft G during an acquisition mode of operation and is further adapted to correspond with the actual air speed of the reference craft R during a formation operation mode as will become more clear further below.

During the aforementioned acquisition mode, a switch 22 couples the output of error generator 21 to the input of integrator 23, the integrator at such a time being adapted to have a rapid mode of response for slewing its output information $U_D$ to rapidly conform to $U_A$, thereby reducing any error output from generator 21 substantially to zero. During the rapid response mode for integrator 23, the integrator serves simply as a shaft positioning servo and no along-course rate information is provided at the output of generator 21. After the aircraft G is initially located at or near its proper station, the switch 22 is adjusted for coupling the output of comparator 19 to the input of the integrator 23 for a tracking or formation mode of operation. The integrator 23 is adapted to have a slow response time during the formation flying mode and the output $U_D$, which was initially calibrated at the last value of $U_A$ will eventually become related to the actual speed of the reference craft with any output from generator 21 comprising $\Delta U$ information representing along-course positional rates. During the time the integrator 23 has a slow response mode of operation, persistent positional errors $\Delta X$ due to relative errors in air speed measurement between the reference and guided aircraft, for example, are integrated to produce slowly a compensating change in $U_D$ until the proper position and air speed of the guided craft is attained.

An along-course positional rate error signal $\Delta U$ is produced by generator 21 when the $U_A$ and $U_D$ information at the inputs of device 21 are not in correspondence. This along-course positional rate signal $\Delta U$ is supplied to a combining network and detector 24 where it is algebraically combined with any along-course positional error signal $\Delta X$ from comparator 19. A detected output is produced by the device 24 which is proportional to the algebraic difference of the input signals supplied thereto so that if the magnitudes of a $\Delta X$ signal and a $\Delta U$ signal at the output of the error generator 21 are equal and the phases of such signals are the same, the output from device 24 is zero. If the output of device 24 is maintained zero by properly controlling the throttle of the guided aircraft, it is readily eased into a desired along-course station with zero relative velocity or overshoot.

Measured bearing angle information $\psi_A$ of the guided aircraft R relative to magnetic north is supplied to a bearing error generator 25 for comparison with a desired bearing angle $\psi_D$ from an integrator 26. The $\psi_D$ information corresponds with the actual measured bearing or heading of the guided aircraft during an acquisition mode of operation for the system as the switch 27 is adapted during such a mode to connect the output of error generator 25 to the input of integrator 26, integrator 26 being adapted by suitable means not shown in FIG. 1 to have a rapid mode of response at this time. The integrator 26 serves during the aforementioned acquisition mode as a shaft position servo to set $\psi_D = \psi_A$. When the guided aircraft G is initially located at or near its proper station, the switch 27 is adjusted for coupling the output of the comparator 20 to the input of the integrator 26 for a tracking or formation mode of operation. The integrator 26 is adapted by suitable means not shown in FIG. 1 to have a slow response time during the tracking mode.

After switching of the integrator 26 for coupling to the output of comparator 20 and integrator operation in a slow mode, the difference $\Delta \psi$ at the output of error generator will relate to changes in the actual heading of the guided craft from a desired heading therefor. The output from generator 25 is supplied to a multiplier 32 which also receives the $U_D$ information from integrator 23 for multiplication of such information. A signal $(U_D)(\Delta \psi)$ proportional to cross-course rate is supplied from multiplier 32 to the combining network 28.

Any persistent positional errors $\Delta Y$ due to errors in measurement of relative headings between the reference and guided aircraft, will cause a compensating change in $\psi_D$ when the integrator 26 has a slow mode of response and is coupled to the output of comparator 20 until $\Delta \psi$ at the output of error generator 25 represents accurately the heading difference between the reference and guided craft.

A detected output is produced by the device 28 which is proportional to the algebraic difference of the input signals supplied thereto. If the magnitude of a $\Delta Y$ positional signal and a signal proportional to cross-course rate at the output of multiplier 32 are equal and the phases of these signals are the same, the output from device 28 is zero. If the aircraft is properly steered to maintain this output zero, it will remain at its proper along-course station with zero relative velocity and without hunting.

The outputs of devices 24 and 28 are utilized for displacing horizontal and vertical pointer or bars of a cross-pointer indicator 29 in vertical and horizontal directions, respectively. The aforementioned displacements indicate to the pilot the amounts of turn and/or speed changes required to attain or remain in formation at a proper station. If both bars are maintained at their center positions, both position and positional rates will be correct for maintaining the guided aircraft at its proper station or attaining a proper station with zero overshoot.

The cross pointer indicator 29 will show any correction required for the guided aircraft if a relative velocity difference exists between the guided and reference craft, even if the guided aircraft's position is correct and vice versa. This arrangement provides for a stable control situation. If the bars of the cross pointer indicator 29 are maintained at a zero position while the pilot guides his craft to approach the correct station therefor relative to a reference craft, the guided aircraft will reach the proper station with zero relative velocity and no overshoot as was mentioned before. The outputs from the devices 24 and 28 may also be supplied through switches 30 and 31 to suitable throttle and turn control servo systems for automatically correcting positional and/or short term rates changes in the speed and heading of the reference craft during a formation mode of flying.

In discussing the operation of the system shown in FIG. 1, let it be assumed that the reference aircraft R is flying at a predetermined height, speed and average heading relative to magnetic north and that the pilot of the guided craft G has flown under visual conditions or by utilizing the radar indicator 42 such as a P.P.I. until his craft approaches the proper station relative to the reference craft and is at the same elevation. The craft to be guided may then be automatically kept at a proper elevation by suitable altimetry in conjunction with an autopilot not shown. During the approach time the switches 30 and 31 for connection to automatic throttle and turn controls are disconnected from the outputs of devices 24 and 28 with the aircraft to be guided being controlled by manual controls operated by the pilot. At the same time, the switches 22 and 27 should be coupled to the outputs of the error generators 21 and 25, respectively, so that the outputs from the integrators 23 and 26 are caused to correspond to the guided craft's measured air speed and measured heading, respectively. At such a time, the integrators 23 and 26 are adapted for rapid slewing to quickly reduce output signals from error generators 21 and 25 to zero.

During the final few hundred feet of joining formation, for example, the pilot of the reference aircraft uses the cross pointer indicator 29 with positional error signals alone being supplied to networks 24 and 28 for operation of the indicator 29 so that the pilot can navigate his craft more nearly to its proper station. The pilot adjusts the manual throttle and turn controls of the aircraft until $\Delta X$ and $\Delta Y$ error displacements are reduced substantially to zero, which may be ascertained by watching the indicators 29 or 42. After attaining an approximate station with an approximate heading and air speed from the guided aircraft flight instruments, the system is turned on for a formation mode of operation, switches 22 and 27 being thrown to the outputs of comparators 19 and 20, respectively with the integrators 23 and 26 being switched to have a slow response mode. Proper formation may then be maintained by the pilot in conjunction with the information provided by indicator 29, or switches 30 and 31 could then be coupled to the outputs of devices 24 and 25 for completely automatic control through suitable automatic throttle and heading servo systems coupled to switches 30 and 31, respectively.

It is possible, immediately after the system is begun to be operated in its tracking or formation mode, that the actual air speed and/or heading of the guided aircraft might not be quite the same as that of the reference craft. In view of the slow response of integrators 23 and 26 during the formation mode, air speed and/or heading differences due to calibration differences in the guided and references aircraft speed and bearing instruments are compensated or effectively cancelled in response to the outputs from devices 24 and 28 until the guided aircraft is at its proper station travelling at the same speed and at the same heading as the reference aircraft. Residual positional errors due to errors in measuring positional rates are also also cancelled out.

If radio contact between the guided and reference craft is momentarily lost or deliberately broken for security purposes, positional error signals should be removed from the indicator by opening switches 33 and 34 at the outputs of comparators 19 and 20, respectively. Switches 33 and 34 are coupled for joint operation to a suitable actuating means 35, means 35 being operated manually or automatically by suitable means, not shown, when the $R_A$ output from the radar system is interrupted. If the guided aircraft's along-course or cross-course speed slowly departs from the formation speed during such a time, the instrument 29 will indicate to the pilot the proper corrective turn and throttle settings so that the guided aircraft maintains the same speed and heading occurring at the time radio contact was broken. Thus, formation can be approximately maintained although accumulative errors depending on residual errors in calibration of $U_D$ and $\psi_D$ and the accuracy of pilot response and differential changes in environmental conditions between the guided and reference aircraft will occur. It can be appreciated if the spacing betwen the guided and reference aircraft is large, this mode of operation represents a valuable method of keeping the aircraft at or near its proper station when out of sight of the reference craft. Upon reconnection of radio contact and closing the switches 33 and 34, the system will automatically act to recalibrate $U_D$ and $\psi_D$ and correct any positional errors in a stable manner.

Figure 3B:
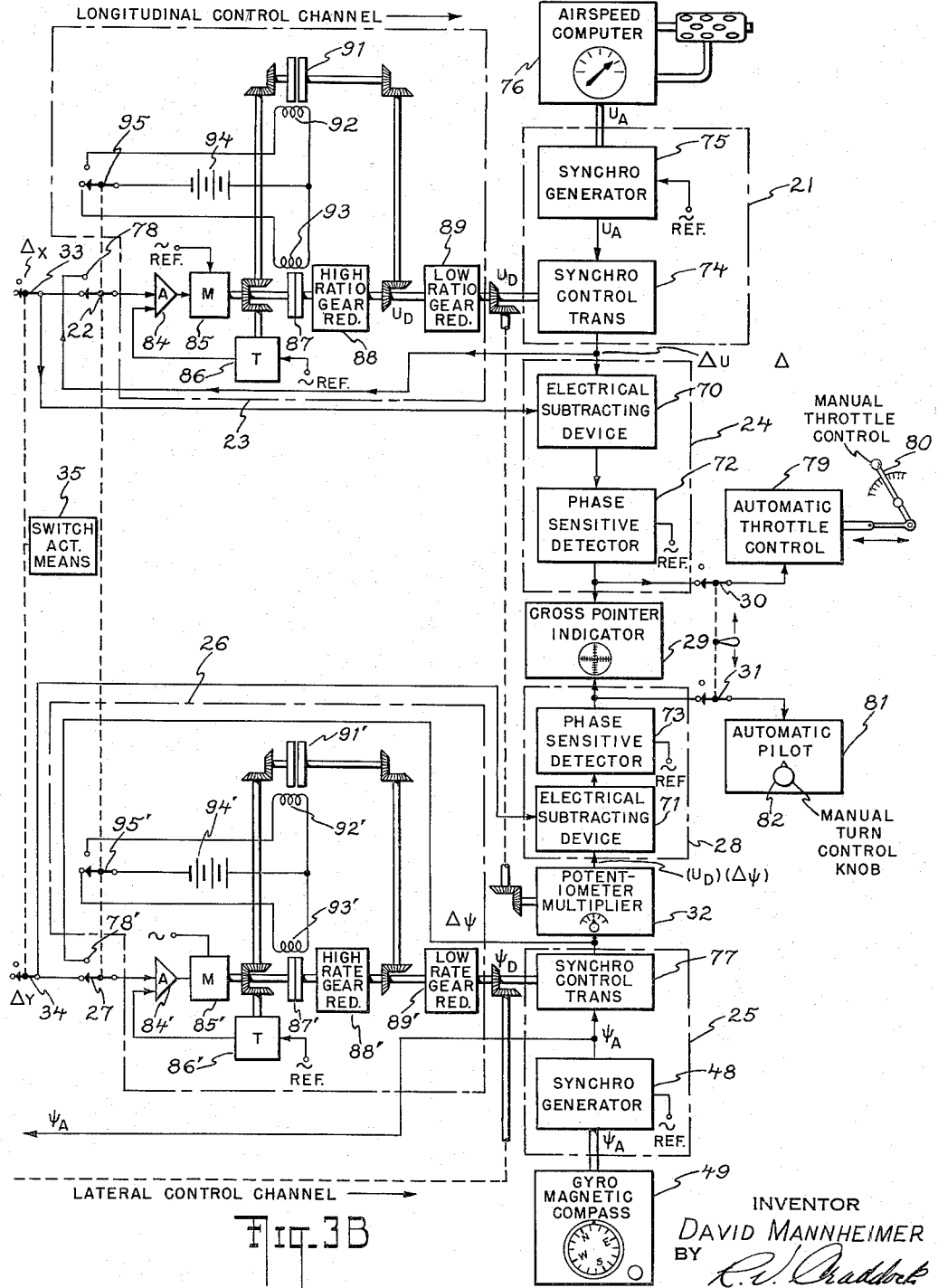

A more detailed schematic diagram of the system illustrated in FIG. 1 is shown in FIGS. 3A and 3B. Corresponding reference numerals are used in FIG. 3 where referring to components similar to those shown in FIG. 1.

Referring now to FIG. 3A, the radar system 11 aboard the guided aircraft may comprise any suitable microwave radar system which automatically provides range and azimuth information of a reference target such as another aircraft relative to the aircraft to be guided. The reference aircraft preferably includes a transponder receiver-transmitter 41 for receiving the energy from the craft to be guided and responding thereto for transmitting energy at a different carrier frequency back to the antenna 12 of the guided craft. The receiver of the radar system 11 is tuned to the carrier frequency of energy received from transponder 41. Noise and ground clutter are reduced to a minimum in such a system.

The radar system 11, if of the antenna tracking type whose antenna 12 is continuously pointed at the reference aircraft during a formation mode of flying, might comprise a pulse modulated or a frequency modulated system. However, if other aircraft are expected to be in the vicinity, the radar system 11 preferably would comprise a track-while-scan type of pulse modulated system in which antenna 12 would be continually rotated about an azimuth axis for providing information upon a P.P.I. device 42 of the positions of the other aircraft relative to the craft to be guided.

If more than one craft is to be guided by the reference craft and the distance to be maintained between adjacent planes is relatively small, a track-while-scan type system would be desirable, although not absolutely necessary.

In any event, whatever type radar system is employed, it should automatically provide a D.-C. range voltage proportional to the distance between the guided and a reference craft and a shaft rotation $\theta_M$ proportional to the angle between the axis of the guided craft and a line between the reference and guided crafts as indicated in FIG. 2.

The range and bearing information from radar system 11 is supplied to the along-course and cross-course resolver 13 comprising a sine cosine potentiometer having the D.-C. signal $R_A$ impressed across the potentiometer while two potentiometer wipers, not shown, are positioned at the angle $\theta_M$ by the bearing shaft from the radar system 11. Two D.-C. output voltages are respectively provided at the aforementioned two wipers of the potentiometer 13, one proportional in magnitude to $R_A \cos \theta_M$ with the other proportional in magnitude to $R_A \sin \theta_M$ as indicated in FIG. 3A.

The along-course and cross-course resolver 18 also comprises a sine cosine potentiometer, having a D.-C. input signal $R_D$ from the station control 16 impressed across the potentiometer while its two wipers are positioned at the angle $\theta_D+\Delta\psi$ by a shaft output from station control 16. Two D.-C. output voltages are respectively produced at the two wipers of the potentiometer 18, one being proportional to $R_D \cos (\theta_D+\Delta\psi)$ and the other being proportional to $R_D \sin (\theta_D+\Delta\psi)$. These sine and cosine voltages should be of the same magnitudes and polarities as the respective sine and cosine voltages from potentiometer 13 whenever the guided craft is at its proper station relative to the reference craft.

The $R_D$ input for the station control 16 comprises a D.-C. voltage derived from a potentiometer 43 energized by a D.-C. source 40, the potentiometer being calibrated for range. The station control 16 contains a suitable isolating network 44 between the potentiometer 43 and the resolver 18 to prevent loading of the potentiometer by the resolver. $R_D$ voltages applied to the resolver 18 from network 44 should correspond to the $R_A$ voltages supplied to resolver 13 from the radar system 11 for the same ranges. The potentiometer 43 is adjusted for providing a voltage proportional to whatever range $R_D$ is desired to be maintained between the craft to be guided and the reference craft.

The $\theta_D$ input for the station control 16 comprises a shaft whose angular displacement from a zero reference position is equal to a desired $\theta_D$ angle. The $\theta_D$ shaft should be adjusted to a desired angle as determined from a dial 45 calibrated in degrees. An $\psi_D$ input shaft is also coupled to the station control 16, being rotated from a zero reference therefor by an angle equal to the angle between magnetic north and a desired heading for the guided craft.

The station control 16 contains a mechanical differential 46 for receiving the mechanical information from the $\theta_D$ and $\psi_D$ input shafts for algebraically summing the angles of rotation of the two shafts. An output shaft of the mechanical differential 46 is rotated by an angle equal to $\theta_D+\psi_D$, and is coupled to a rotor shaft of a synchro differential 47.

The stator windings of synchro differential 47 are energized through a three wire line connected to the electrical output of the stator windings of a synchro generator 48, shown in FIG. 3B. The rotor of synchro generator 48 is positioned by a gyromagnetic compass 49 aboard the guided craft at an angle proportional to the measured heading $\psi_A$ of the guided craft relative to magnetic north. Thus, a three wire electrical input to synchro differential 47 from synchro generator 48 is equal to $\psi_A$, the electrical output at the rotor windings of differential 47 being three wire and equal to $$\theta_D+\psi_D-\psi_A=\theta_D+\Delta\psi$$

The electrical output signal from differential 47 is supplied over a three wire line to the stator windings of a synchro control transformer 51 in station control 16.

The synchro control transformer 51 functions in a conventional manner for developing a single phase A.-C. error voltage across its rotor winding related to the difference between the angle of rotation of its rotor 52 from a reference position and the angle represented by the electrical input to the stator windings thereof. Any A.-C. error voltage developed by the control transformer 51 is supplied to an amplifier 53 for actuating servomotor 54 whose output shaft drives shaft 52 until the angular relationship thereof is synchronized with the angular information at the stator input of the control transformer 51 and no error voltage is present at the input of amplifier 53. Thus, the output shaft from the station control 16 is positioned at an angle which is proportional to $\theta_D+\Delta\psi$.

The along-course information from the potentiometer resolvers 13 and 18 is compared in a full wave switch modulator 61 of the along-course comparator 19. The modulator is conventional in the art, being similar to that shown at (d) on page 404 of the book entitled "Waveforms," vol. 19 of the M.I.T. Radiation Laboratory Series, copyright 1949, by McGraw-Hill, and provides an A.-C. output voltage of a frequency corresponding to that of an alternating reference voltage supplied to terminal 57 indicated in FIG. 3A, a magnitude which is proportional to the difference between the along-course D.-C. voltages from the potentiometers 13 and 18, and a phase which is either in phase or 180° out of phase with the reference voltage depending on which of the along-course information from potentiometers 13 and 18 is larger. The output from the modulator 61 comprises an A.-C. error voltage proportional to any along-course error $\Delta X$ between the two aircraft.

The two D.-C. voltages proportional to cross-course information from the potentiometer resolvers 13 and 18, respectively, are supplied to a further full wave switch modulator 62 similar to modulator 61 with the same source of alternating reference voltage supplied to its reference voltage terminal 58 as is applied to terminal 57 of modulator 61. The modulator 62 provides an A.-C. output voltage of a magnitude proportional to the difference between cross-course D.-C. voltages from potentiometers 13 and 18, and a phase which is either in phase or 180° out of phase with the alternating reference voltage supplied to terminal 58 depending on which of the D.-C. input voltages is the larger.

The remaining components of the along-course and cross-course comparators 19 and 21 comprise amplifiers 63 and 64 for amplifying the $\Delta X$ and $\Delta Y$ error voltages, respectively, adjustable attenuators 66 and 67 for regulating the gain of the output error voltages from amplifiers 63, 64, respectively, and limiters 68 and 69 at the outputs of the comparators 19 and 21, respectively, for establishing a desired upper limit on the error voltages from comparators 19 and 21 so that air speed and heading changes cannot become excessive. The adjustments for attenuators 66 and 67 are ganged together and controlled by a knob 65 as shown in FIG. 3A so that the gains of the voltages at the outputs from the comparator circuits 19 and 21 are simultaneously adjustable. The gain is a function of the distance the guided craft is desired to be spaced from the reference craft, it being generally desired to have the largest gain for close spacings between the aircraft and less gain for greater spacing between the aircraft. Generally the knob 65 for regulating attenuators 66 and 67 would be controlled simultaneously with the $R_D$ set control at the input of the station control.

The $\Delta X$ and $\Delta Y$ positional error voltage outputs from the comparators 19 and 21 are supplied to electrical subtracting devices 70 and 71 of the algebraic combining and detector networks 24 and 28, respectively, as is shown in FIG. 3B. The electrical subtracting devices 70 and 71 also receive positional rate error voltages from the along-course air speed error generator 21 and heading rate error voltages from potentiometer multiplier 32 coupled to the output of the cross-course error generator 25. Any A.-C. difference voltages from devices 70 and 71 are detected by phase sensitive detectors 72 and 73 for supply to indicator 29 and control of the horizontal and vertical indicator bars, thereof, respectively.

The air speed error generator 21 comprises a synchro control transformer 74 and a synchro generator 75 whose stator windings are coupled together through a three wire line. The rotor of control transformer 74 is coupled to the $U_D$ shaft output from integrator 23 whose angular position corresponds to a desired air speed for the guided craft. The rotor of generator 75 is coupled to a $U_A$ shaft whose angular position corresponds to the measured air speed of the guided aircraft as determined by an air speed computer 76. The electrical zero position for generator 75 would generally be adapted to correspond to some predetermined measured air speed such as 300 miles per hour. An A.-C. voltage signal is produced across the rotor winding of control transformer 74 proportional to the difference between $U_A$ and $U_D$ for supply over a two wire line to the electrical subtracting device 70.

When there is a difference in magnitude between a positional ΔX error signal and a rate signal at the output of control transformer 74 and/or when there is a 180° difference in phase therebetween, an A.-C. output signal of one or an opposite phase is provided by subtracting device 70 which is supplied to phase sensitive detector 72. The detector 72 produces a D.-C. voltage whose magnitude is proportional to the A.-C. input voltage supplied thereto with a polarity depending on the phase of the output from device 70. This detected output voltage is applied to the cross pointer indicator 29 causing the horizontal bar thereof to deviate one way or another (depending on the polarity of the voltage from detector 72) from its center position by an amount equal to the difference between voltages equivalent to the ΔX and $$(U_A - U_D)$$

signals. During automatic operation, the output of detector 72 is also supplied through switch 30 to an automatic throttle control servo system 79 indicated in FIG. 3B. A manual throttle control 80, is provided with the aforementioned servo system as is indicated for manual control of the guided aircraft speed when desired.

The bearing error generator 25 comprises a synchro control transformer 77 and synchro generator 48 whose stator windings are coupled together by a three wire line (indicated by only one lead in the drawings). The rotor of control transformer 77 is coupled to the $\psi_D$ shaft output from integrator 26 whose angular position corresponds to a desired heading for the guided craft. Since the electrical output at the stator windings of synchro generator 48 is proportional to the angle $\psi_A$, an output across the rotor winding of the control transformer 77 is proportional to Δψ, the difference between $\psi_A$ and $\psi_D$. This Δψ output is fed to the potentiometer multiplier 32 which converts heading error to cross-course velocity by the relation $$\frac{\Delta Y}{dt} = U_A \sin \Delta \psi \cong U_D \sin \Delta \psi$$

This latter ouput is supplied to subtracting device 71, which in turn is coupled to a phase sensitive detector 73 which produces a D.-C. output voltage proportional to the A.-C. output voltage from device 71 with a polarity reversing with a reversal in phase of the A.-C. output voltage from device 71. The voltage from detector 73 is applied to cross-pointer indicator 29 for causing the vertical bar thereof to deviate one way or another from its center position for suitable turn control command information. The output from detector 73 may also be supplied through switch 31 to an automatic pilot servo system 81 where complete automatic control of the guided aircraft's heading is desired during a formation mode of flying. Manual control of the aircraft is regulated by a manual turn control knob 82 on the automatic pilot indicated in FIG. 3B.

The integrator 23 of the longitudinal control channel comprises an A.-C. amplifier 84 whose output is supplied to the control winding of a two phase A.-C. induction motor 85. The line voltage for motor 85 is supplied from an A.-C. source of voltage whose frequency corresponds to that of the other reference sources of voltage for the system such as 400 cycles/sec. The phase of the line voltage for motor 85 should be shifted by suitable means, not shown, by ninety degrees relative to the phase of the error control voltage from amplifier 84. The speed of rotation of motor 85 is proportional to the magnitude of the voltage supplied to its control winding with the direction of rotation thereof reversing with a phase reversal of the control voltage. A conventional stabilizing feedback loop comprising an A.-C. tachometer generator 86 is coupled from the output of motor 85 back to the input of amplifier 84 for damping purposes. If desired, the tachometer feedback loop for motor 85 might be adapted to provide a larger percent of feedback during the slow mode of operation for integrator 23 than during the rapid response mode therefor.

The output from the motor 85 has two modes of connection to the $U_D$ output shaft of the integrator 23. One mode is comprised of a conventional magnetic clutch 87, a high ratio gear reduction device 88 and a low ratio gear reduction device 89. The other mode is through a clutch 91 and the low gear reduction device 89 when rapid correction or slewing is desired. In the latter case the output of motor 85 is fed directly to the input of the low ratio gear reduction device 89 when the clutch 91 is engaged.

A suitable energization circuit for the clutches 87 and 91 is comprised of windings 92 and 93, which may be alternately excited by a suitable D.-C. source 94 having one terminal coupled to one pair of ends of the windings. A switch 95 is adapted to alternately connect the other terminal of source 94 to one or the other of the other pair of ends of windings 92 and 93 depending on which clutch is desired to be engaged. When switch 95 completes the circuit comprising windings 93 and source 94, clutch 87 becomes engaged magnetically through the action of winding 93 while clutch 91 is opened by suitable bias means not shown. Alternately, when switch 95 completes the energization circuit for winding 92 the clutch 91 is caused to be engaged by the magnetic action of winding 92 and clutch 87 is disengaged by suitable bias means not shown.

The switch 95 is ganged to the switch 22 at the input of integrator 23 so that when the integrator is adapted to be coupled to the output of comparator 19 for receiving a ΔX positional error signal, the output of motor 85 must pass through the high ratio gear reduction 88 as well as the low ratio gear reduction 89. Thus, it is evident that the integrator will be operated in a slow response mode which is principally a function of the ratio of the gear reduction device 88. When the switch 22 is coupled to the terminal 78 for connecting integrator 23 to the output from synchro control transformer 74, the switch 95 is positioned for energization of the winding 92 causing the clutch 91 to become engaged while de-energization of the winding 93 results in disengagement of the clutch 87. Thus, the output of motor 85 bypasses the high ratio gear reduction device 88 and the output shaft $U_D$ can be rapidly slewed into correspondence with the signal $U_A$ supplied to the synchro control transformer 74. The rapidity with which this occurs is a function of the low ratio gear reduction of device 89 and should be generally such the $U_D$ will correspond quickly with $U_A$ without hunting. When the output of motor 85 is supplied through the high ratio gear reduction 88, the integrator 23 should have a response time such as ten minutes, for example. In one system which has been constructed the device 89 had a gear ratio of 1000:1 while the device 88 had a gear ratio 1,680,000:1, for example.

The integrator 26 in the lateral control path of the system is generally the same as the integrator 23 with identical components therein. These components have been referred to by primed reference numerals so that their operation and details need not be referred to in particular. The switch 95' for the clutch energizing circuits of the integrator 26 is ganged to the switches 22 and 95 in the longitudinal control channel and the switch 27 coupled to the input of integrator 26 in the lateral control channel as is illustrated in FIG. 3B. The mechanical output from the integrator 26 is supplied to the rotor of synchro control transformer 77 as is illustrated in FIG. 3B, and is also supplied by suitable gear and shaft arrangement back to the station control 16 for supplying $\psi_D$ information from the integrator to station control 16 for reasons which have already been described.

The reference voltage terminals for the phase sensitive detectors 72 and 73 and the synchro generators 48 and 75 as indicated in FIG. 3B should be supplied with A.-C. voltages of the same phase and magnitude. A common source of supply therefor might generate a 115 volt, 400 cycle/sec. sine wave, for example. Such a source would also be coupled to the reference voltage terminals indicated in FIG. 3B for the tachometer generators 86 and 86' and to the reference or supply voltage terminal indicated in FIG. 3A for the servo motor 54 and the switch modulators 61 and 62. Although the D.-C. voltage sources for potentiometer 43 and the windings for energizing the magnetic clutches of the integrators 23 and 26 have been illustrated in the drawings as batteries, it should be understood that any suitable D.-C. sources could be employed.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for location aboard a first craft for providing guidance information to maintain a predetermined along-course and cross-course distance relationship relative to a second craft, said apparatus comprising a radar system for providing range and azimuth information related to actual distance and actual bearing between the craft, first means responsive to said range and azimuth information for providing along-course and cross-course distance information related to the actual relative coordinate positions of the two craft, second means for providing along-course and cross-course distance information related to desired relative coordinate positions between the two craft, and first and second comparator means coupled to said first and second distance information means, respectively, for producing first and second positional error signals related to any difference between said along-course information and any difference between said cross-course information, respectively.

2. Apparatus as set forth in claim 1, further including means for providing a rate signal proportional to along-course rate differences between the first and second crafts, further means for providing a rate signal proportional to cross-course rate differences between the first and second crafts, and means for combining said rate signals and said positional error signals for providing an output indicative of velocity and heading changes required for maintaining said first craft at a predetermined station relative to said second craft.

3. Apparatus as set forth in claim 1, further including velocity error generator means having a first input for receiving information related to the measured velocity of said first craft and a second input for receiving information related to a desired velocity for said first craft, said velocity error generator means providing information related to the difference between the information at the first and second inputs thereof, bearing error generating means having a first input for receiving information related to the measured bearing of said first craft and a second input for receiving information related to a desired bearing for said first craft, said bearing error generator means providing information related to the difference between the information at the first and second inputs thereof, means coupled between said velocity error generating means and said first comparator means for algebraically combining information therefrom for providing information related to a required change in velocity for the first craft for correcting along-course error and relative velocity differences between the two craft, and means coupled between said bearing error generating means and said second comparator means for algebraically combining information therefrom for providing information related to a required change in bearing of said first craft for correcting cross-course error and relative heading differences between the two craft.

4. Apparatus as set forth in claim 1, further including craft speed and heading determining means for producing information related to the speed and heading of said first craft, first and second error generating means coupled to said craft speed and heading determining means, respectively, for producing error signals proportional to the differences between desired and measured speed and heading of said first craft, said first and second error generating means further being adapted to be coupled to said first and second comparator means for producing error signals proportional to along-course and cross-course rate of deviation of said first craft from desired along-course and cross-course positions relative to said second craft, first means coupled to said first comparator means and said first error generating means for combining the positional error signals and the rate error signals therefrom, and second means coupled to said second comparator means and said second error generating means for combining the positional error signals and the rate error signals therefrom, said first and second combining means being adapted to provide information indicative of speed and heading changes for said first craft required to maintain said first craft at a predetermined position with respect to said second craft.

5. A guidance system for maintaining a first craft at a predetermined location relative to a second craft during movement thereof, comprising a radar transponder located aboard said second craft, a radar interrogator aboard said first craft for emitting radio energy to said second craft for excitation of said transponder for return of radio energy to said first craft for providing information relative to the distance between said craft, said interrogator including means for providing range and azimuth information related to actual distance and actual bearing between the craft, first means responsive to said range and azimuth information for providing along-course and cross-course distance information related to the actual relative coordinate positions of the two craft, second means for providing along-course and cross-course distance information related to desired relative coordinate positions between the two craft, and first and second comparator means coupled to said first and second distance information means respectively, for producing first and second positional error signals related to any difference between said along-course information and any difference between said cross-course information, respectively.

6. A guidance system as set forth in claim 5, further including rate error generating means for providing information proportional to the rate of deviation of said first craft from desired along-course and cross-course positions relative to said second craft, and means coupled to said rate error generating means and said comparator means for response to information therefrom for producing information related to required changes in speed and heading of said first craft to be maintained at predetermined along-course and cross-course positions relative to said second craft.

7. Apparatus for location aboard a first craft for providing guidance information to maintain a predetermined along-course and cross-course distance relationship between said first and second craft, said apparatus comprising a radar system for providing range and azimuth information related to actual distance and actual bearing between the craft, first means responsive to said range and azimuth information for providing along-course distance and cross-course distance information which are functions of the actual relative positions between the two craft, second means for providing along-course distance and cross-course distance information which are functions of desired relative positions between the two craft, comparison means coupled to said first and second means for responding to the information therefrom for producing along-course and cross-course positional error signals related to the difference between said along-course information and the difference between said cross-course information, respectively, first error generator means for producing a signal which is a function of any deviation in measured velocity of said first craft from a predetermined velocity for said craft, second error generator means for producing a signal which is a function of any deviation in measured bearing of said first craft from a predetermined bearing therefor, and means for algebraically combining along-course and cross-course error signals from said comparison means with error signals from said first and second error generator means, respectively, for providing first and second output signals indicative of a change in speed and a change in heading required for maintaining said first craft in a predetermined position relative to said second craft.

8. Apparatus for location aboard a first craft for providing guidance information to maintain a predetermined along-course and cross-course relationship between said craft and a second craft, said apparatus comprising an interrogating circuit for providing range and azimuth information related to actual distance and actual bearing angle between the two craft, first resolving means responsive to said range and azimuth information for providing along-course and cross-course information which are functions of the actual relative positions between the two craft, station control means for producing range and azimuth information related to a desired distance and a desired bearing angle to be maintained between the two craft, second resolving means coupled to said station control means for providing along-course and cross-course information which are functions of desired relative positions between the two craft, and further means coupled to said first and second resolving means for comparing the information therefrom and producing first and second output positional error signals related to the difference between said along-course information and the difference between the cross-course information, respectively.

9. Apparatus as set forth in claim 8, further including means coupled to said station control means for algebraically adding a correction angle to the desired bearing angle information supplied thereto, said correction angle being proportional to the angle between an average heading and the actual heading of said guided craft.

10. Apparatus as set forth in claim 9, further including means for generating along-course and cross-course rate error signals related to along-course and cross-course rate differences between said first and second crafts, and means for algebraically combining said rate error signals and said positional error signals for providing information related to required changes in speed and heading of said first craft for remaining at a predetermined station relative to said second craft.

11. Apparatus as set forth in claim 10, further including cross-course pointer indicator means coupled to said combining means for providing a visual indication of the position of said first craft relative to said predetermined station.

12. Apparatus for location aboard a first craft for providing guidance information to maintain a predetermined along-course distance relationship $X_D$ and cross-course distance relationship $Y_D$ relative to a second craft, said apparatus comprising a radar system for providing range and azimuth information related to the actual distance $R_A$ between the craft and an angle $\theta_M$ between the actual heading of said first craft and a line connecting the actual positions of said craft, first resolving means responsive to said range and azimuth information for providing along-course distance information $X_A$ and cross-course distance information $Y_A$ related to the spacing between said craft, station control means for providing output information related to a desired distance $R_D$ to be maintained between said craft and a bearing angle $\theta_D + \Delta\psi$, where $\theta_D$ corresponds to a desired bearing angle between a line along the desired heading for said first craft and a line connecting said first craft to said second craft when said first craft is at its desired position and $\Delta\psi$ is the angle between actual and average headings for said first craft, second resolving means coupled to said station control means and responsive to the information therefrom for providing along-course and cross-course distance information related to desired coordinate distances to be maintained between the two craft, first and second comparator means coupled to said first and second and resolving means for providing first and second positional error signals $\Delta X$ and $\Delta Y$, respectively, related to any difference between said along-course information and any difference between said cross-course information, respectively, air speed error generating means having measured air speed $U_A$ input and a desired air speed $U_D$ input for providing information related to any difference between measured air speed of said first craft and a desired air speed for said first craft, bearing error generating means having measured bearing $\psi_A$ input and a desired bearing $\psi_D$ input for providing information related to any difference between measured bearing of said first craft and a desired bearing for said first craft, means coupled to said air speed error generator means and said first comparator means for algebraically combining information therefrom for providing information related to a required change in velocity for the first craft for correcting along-course positional error, means coupled between said bearing error generator means and said second comparator means for algebraically combining information therefrom for providing information related to a required change in bearing of said first craft for correcting cross-course positional error, a first integrator coupled between said first comparator means and said air speed error generating means for regulating the $U_D$ input thereto as a function of positional error $\Delta X$, and a second integrator coupled between said second comparator means and said bearing error generating means for regulating the $\psi_D$ input thereto as a function of positional error $\Delta Y$.

References Cited in the file of this patent

UNITED STATES PATENTS

| | | |
|---|---|---|
| 2,360,361 | Mountbatten | Oct. 17, 1944 |
| 2,599,889 | Briggs et al. | June 10, 1952 |